Dec. 28, 1937.  E. FRIEDLÄNDER  2,103,774
REGULATING SYSTEM
Filed Nov. 29, 1935   2 Sheets-Sheet 1
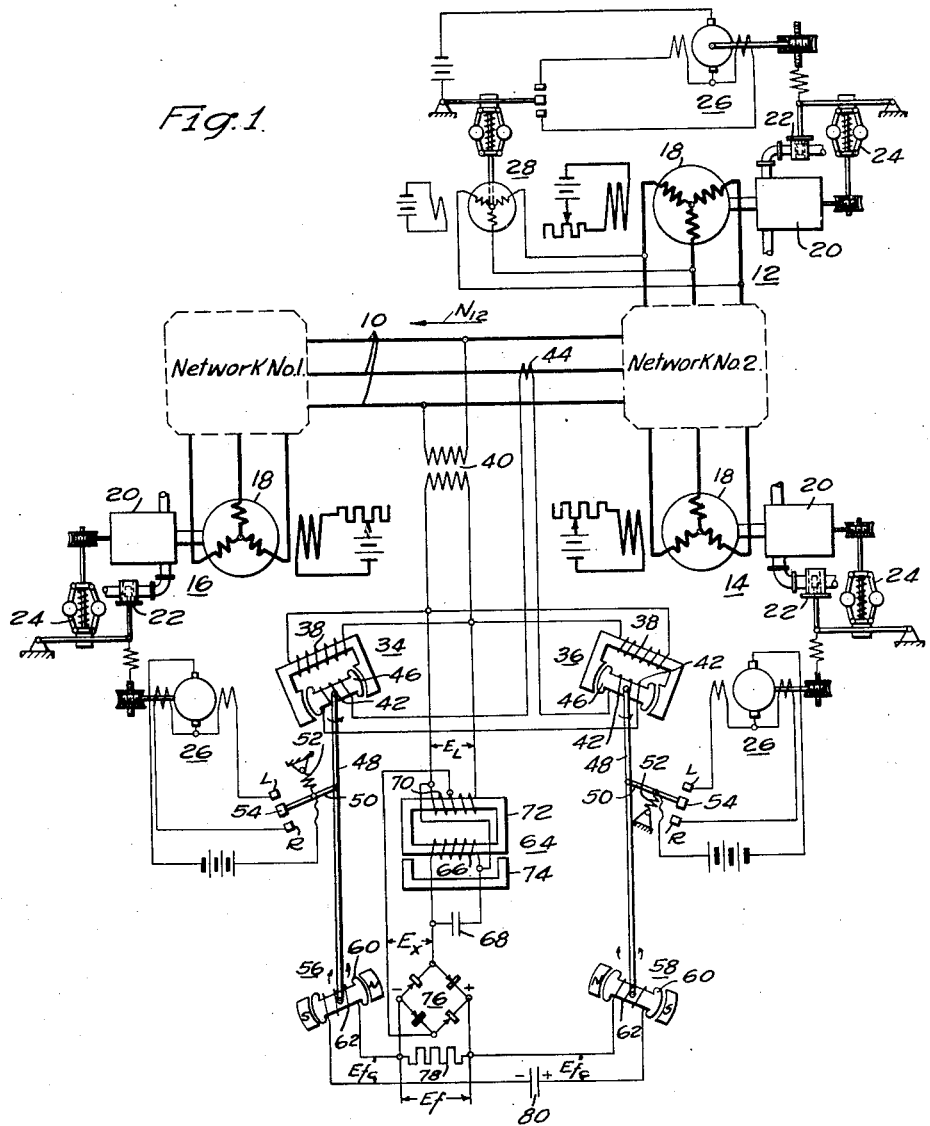
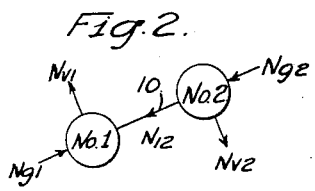
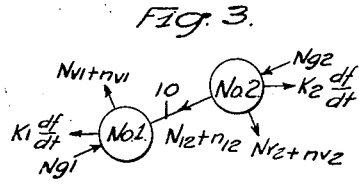
WITNESSES:
INVENTOR
Erich Friedlander.
BY
ATTORNEY Dec. 28, 1937.  E. FRIEDLÄNDER  2,103,774
REGULATING SYSTEM
Filed Nov. 29, 1935  2 Sheets-Sheet 2
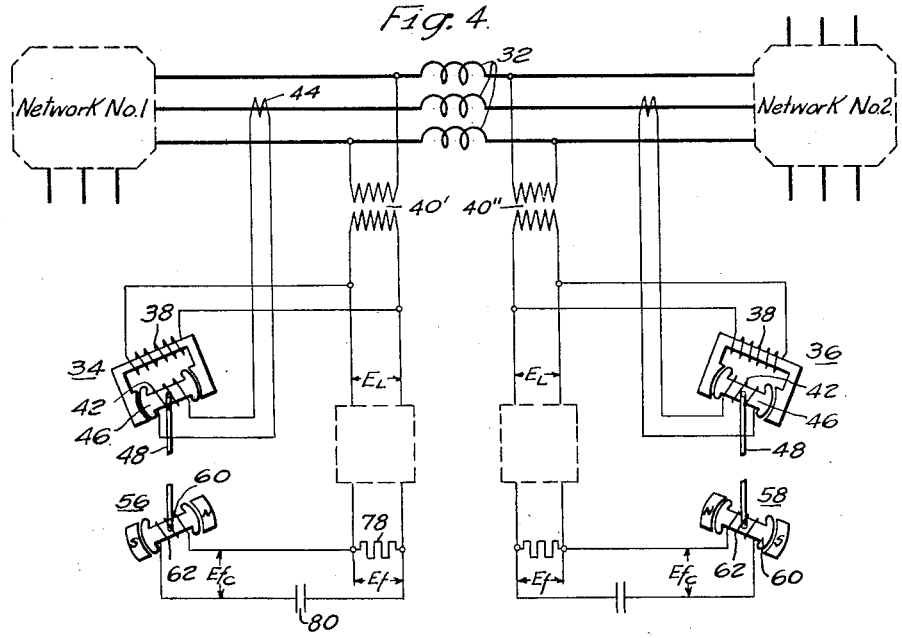
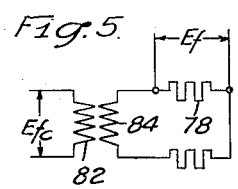
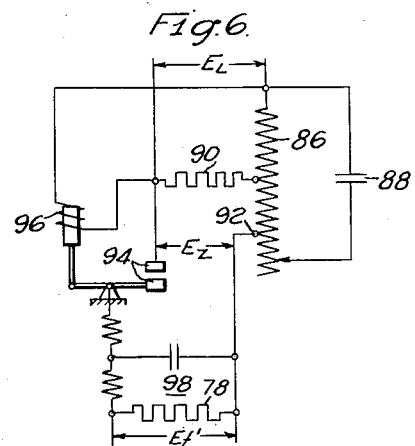
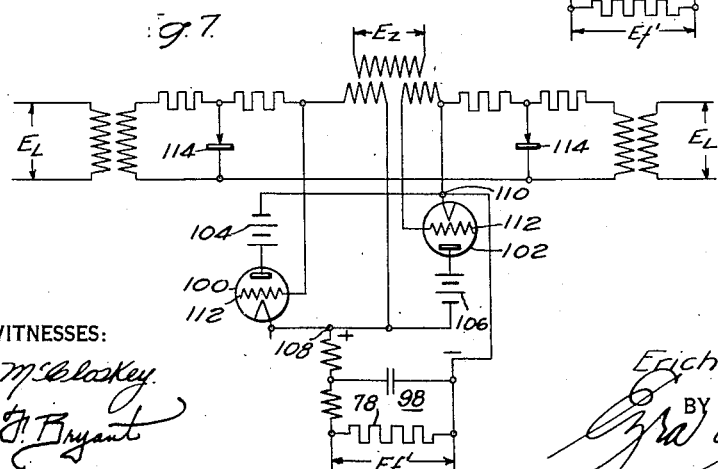
WITNESSES:  INVENTOR
Erich Friedländer
BY
ATTORNEY Patented Dec. 28, 1937

2,103,774

UNITED STATES PATENT OFFICE 2,103,774

REGULATING SYSTEM

Erich Friedländer, Berlin-Siemensstadt, Germany, assignor to Westinghouse Electric & Manufacturing Company, East Pittsburgh, Pa., a corporation of Pennsylvania Application November 29, 1935, Serial No. 52,075
In Germany February 27, 1935

14 Claims. (Cl. 171—119)

My invention relates to regulating systems and it has particular relation to systems for automatically controlling the flow of power between two interconnected alternating-current networks each of which comprises generating or other synchronous apparatus.

An exchange of power between two such network systems may be predeterminedly regulated by controlling the frequency of one of the networks and supervising in accordance with the tie-line power flow the output of a portion of the generating capacity of the other. In .arrying this arrangement into practice, however, difficulty is encountered in suppressing regulatory oscillations. These are found to be particularly pronounced when the tie-line load is relatively small in comparison with the load capacities of the interconnected systems.

The explanation for the presence of these oscillations is that the rotating or flywheel masses comprised by the synchronous apparatus of both network systems take part during transient conditions in supplying or absorbing power, even when the demand or supply change occurs in one of the systems only. In the conventional form of regulating system above discussed, no account is taken of the energy supplied to or withdrawn from these rotating masses and in consequence a functioning of the regulators is initiated by all changes in the flow of tie line power although, particularly in the case of sudden changes, this functioning may be entirely unnecessary. The result is the objectionable oscillations above mentioned. These consist of overswings produced by the excess regulating action which require that nullifying reverse adjustments subsequently be made.

Generally stated, the object of my invention is to eliminate the above-described objectionable form of regulatory operation.

A more specific object is to provide a tie-line power-flow regulating system in which the major or power-flow-sensitive corrective-action initiating influence is supplemented by a modifying influence determined by the rotating-mass energy transfer in the interconnected network systems.

A further object is to utilize in such a regulating system the rate of frequency change of the network system voltages as this modifying or oscillation-eliminating influence.

In practicing my invention, I achieve the above-stated objects by causing initiations of power-flow correction to be dependent not only on the magnitude of the difference between the actual and the desired flow of tie line power but also upon the time derivative of the network voltage frequency. As a result my improved regulating system is permitted to control the network generating units which it supervises in an oscillation-eliminating manner.

My invention itself together with additional objects and advantages will best be understood through the following description of specific embodiments thereof when taken in conjunction with the accompanying drawings, in which Figure 1 is a diagrammatic view of apparatus and circuits illustrating a preferred embodiment of my invention as applied to a regulator for controlling the power interchange between two alternating-current network systems, Figs. 2 and 3 are simplified representations of the system of Fig. 1 diagrammatically indicating the power interchange relations under steady-state and transient conditions respectively, Fig. 4 is a partial diagrammatic reproduction of the system of Fig. 1 showing modifications desirable for adapting it to a tie-line having substantial reactance or impedance characteristics, Fig. 5 is a diagrammatic representation of an alternate manner in which a control potential proportional to the rate of change of frequency may be derived from a frequency proportional voltage, Fig. 6 is a diagrammatic representation of a second combination of apparatus for obtaining a frequency proportional voltage, and Fig. 7 represents electronic tube equipment capable of simultaneously rectifying and amplifying the intermediate frequency-responsive voltage produced by the equipment of Fig. 6.

In Fig. 1 of the drawings, I have represented a tie line circuit 10, assumed to have little or no impedance, as rigidly interconnecting two alternating current network systems, each of which comprises certain generating and power consuming apparatus which in the interest of simplicity has not been represented. As forming a part of network No. 2, I have illustrated two generating units 12 and 14 while as directly connected with network No. 1 I have similarly shown a generating unit 16.

Each of the represented units comprises a synchronous generator 18 which is driven by a turbine or other prime mover 20 having input adjusting means 22 supervised by speed responsive governing mechanism 24 the calibration of which may be changed by operating the motor 26 to thereby adjust the unit output.

Associated with generating unit 12, which will be assumed to have sufficient capacity to determine the frequency of network No. 2, is a frequency regulator 28 which functions in well known manner to so control the energization of the calibration changing motor 26 as to maintain constant the frequency of the voltage of the network power circuits with which its generator 18 is directly connected. It will further be assumed that the second represented generating unit 14 functions to supply fluctuations in power demand to which network No. 2 is subjected, and that generating unit 16 functions in a similar manner with respect to network No. 1 of which it forms a part.

Power interchange through tie-line 10 may be adjusted by controlling the relative frequencies of the voltages acting in the two networks interconnected thereby. When the voltage of network No. 2 tends to lead the voltage of network No. 1, power will flow from right to left, in the manner indicated by arrow $N_{12}$, the magnitude of this power being determined by the amount or degree of this leading tendency. Likewise, if the voltage of network No. 2 lags that of network No. 1 there will be a reversal of power flow.

The mentioned magnitude of voltage lead of the power supplying network is, in turn, determined by the input supplied to its generating unit driving means. Thus, assuming that the power flow is as indicated by arrow $N_{12}$, the magnitude of this flow may be decreased either by decreasing the output of generating unit 14 which supplies network No. 2 or by increasing the output of generating unit 16 which supplies network No. 1. Similarly, the flow may be increased by decreasing the output of unit 16 or increasing that of unit 14.

As previously mentioned, when units 14 and 16, for example, are supervised in response only to changes in the tie line power flow, unnecessary adjustments in the unit loading are produced which result in objectionable oscillations or overshootings of the regulatory action. This is because, as already pointed out, no account is taken of the amounts of energy which during transient conditions are supplied to or withdrawn from the rotating masses comprised by the generating and other apparatus which form a part of the interconnected network systems. By supplementing, in accordance with the teachings of my invention, this major control influence by a modifying factor determined by the rate of change of the network voltage frequencies these oscillations may be completely eliminated.

Before explaining the structure which I prefer to use in carrying my invention into practice, I shall summarize a mathematical explanation of the phenomenon upon which the herein disclosed improvements are based.

In Figs. 2 and 3, in which the two interconnected networks of Fig. 1 are represented in simplified form, I have designated by $N_{g1}$ the amount of power generated in network No. 1. The amount of power consumed by network No. 1 is designated by $N_{v1}$, the amount of power generated in network No. 2 by $N_{g2}$ and the amount of power consumed by network No. 2 by $N_{v2}$. The amount of power exchanged between the two network systems through tie line 10 under steady state conditions is indicated by $N_{12}$.

For the assumed steady state conditions represented by Fig. 2, the following equations may be written:

$$N_{g1} + N_{12} = N_{v1}$$

and $$N_{g2} - N_{12} = N_{v2}$$

If now, at a certain instant, the amount of power consumed by either of the network systems ceases to conform with the above expressed relations applicable to steady state conditions, the change in this power demand will be supplied or absorbed partly by the rotating or flywheel masses in the system in which the change occurs and partly by the rotating masses of the second or interconnected network system. If the change is a rise above the initial value, the mentioned rotating masses will supply a portion thereof. If it is a decrease, they will act to store therein a portion of the energy represented by the change.

If the change be assumed to be in the form of an increase in power demand in network system No. 1 and designated by symbol $n_{v1}$ and if symbol $n_{v2}$ designate the resulting increase in power demand in interconnected system No. 2, and further if the resulting change in tie line power flow from the initial value be designated as $n_{12}$, it can be shown mathematically that the following equations apply to this assumed transient state, which in part is represented by Fig. 3:

$$N_{g1} + N_{12} + n_{12} - N_{v1} - n_{v1} = N_{n1} \cdot \frac{T_{a1}}{f_n} \cdot \frac{df}{dt}$$

and $$N_{g2} - N_{12} - n_{12} - N_{v2} - n_{v2} = N_{n2} \cdot \frac{T_{a2}}{f_n} \cdot \frac{df}{dt}$$

In these equations $N_{n1}$ and $N_{n2}$ designate the nominal ratings of the generating units that are operating in the two network systems, $T_{a1}$ the nominal "starting time" of the entire network system No. 1, $T_{a2}$ the starting time of the entire network system No. 2 and $f_n$ the nominal frequency of the network voltages. The term "starting time" refers to the period required to accelerate the generators connected to the network system up to speed corresponding to nominal frequency with the nominal torque when all power-consuming apparatus having rotating or flywheel masses is connected to the system and when further the power absorbed by these equipments in the course of acceleration is used exclusively to accelerate their rotating masses. For systems encountered in practice from 20 to 30 seconds is found to be representative.

Eliminating from the above equations the before expressed terms applicable to the initial steady state conditions of operation the amounts of power not accounted for by the output supplied by the generating units during these transient conditions are expressed in the following two equations:

$$n_{12} - n_{v1} = k_1 \frac{df}{dt}$$

$$-n_{12} - n_{v2} = k_2 \frac{df}{dt}$$

When written in the following form, $$n_{v1} = n_{12} - k_1 \frac{df}{dt}$$

$$n_{v2} = -n_{12} + k_2 \frac{df}{dt}$$

these equations, applicable to the solid tie-line connection shown in Fig. 1, indicate that in each network system the amount of power ($n_{v1}$ or $n_{v2}$) not accounted for by the output of the generating units is equal to the amount ($n_{12}$) by which the flow of tie line power has deviated from its nominal or desired power plus or minus an amount of power which depends on the time derivative of the frequency.

In the above considered case of two networks rigidly interconnected, the frequencies of the two systems will always be equal to one another. If, however, the two network systems are connected through a tie line offering substantial impedance or reactance, diagrammatically indicated in Fig. 4 by the reactors 32, the frequencies of the two systems during transient conditions are not necessarily the same. To make the before stated equations applicable to such a situation, they must be revised as follows:

$$n_{v1} = n_{12} - k_1 \frac{df_1}{dt}$$

$$n_{v2} = -n_{12} + k_2 \frac{df_2}{dt}$$

Here, the symbols $f_1$ and $f_2$ respectively designate the instantaneous frequencies of the networks Nos. 1 and 2.

The stated equations indicate that in all situations involving interconnected networks of the class described, the amount of power in each system not accounted for by the output of its generating units, and hence supplied or absorbed by the rotating masses of the synchronous apparatus, depends on the deviation of the flow of tie line power from its nominal value and on the first derivative of the frequency.

These equations also plainly show that to solve the before-discussed problem of controlling the flow of tie-line power it is merely necessary to add to the major controlling quantity a corrective or modifying term which is proportional to the rate of change of frequency. If on the basis of the starting time, the rated power of the active generating units and certain other factors the magnitude of this corrective term is properly selected the conditions expressed by the set of equations given above will be fully met and regulatory oscillations thereby eliminated.

In cases of tie lines involving substantial reactance, the controlling frequency $f_1$ or $f_2$ must, of course, be measured respectively at the end of the line to which is connected the network system comprising the machining to be controlled. For the rigid type of connection typified by Fig. 1, however, the single available frequency may be utilized in the control of generating units in either or both of the interconnected network systems.

Considering now the manner in which the improvement of my invention may be worked out, I have in Fig. 1 illustrated apparatus for applying it to the control of the before described generating units 14 and 16, respectively, comprised by the two interconnected networks. It will, of course, be understood that this control might not in all cases be applied to units in both systems but may effect the desired regulation of power flow through the tie line 10 by controlling one or more units in only one of the two networks. Since, however, simultaneous control of both is permissible and proper, such an arrangement has been illustrated.

In it, the power flow responsive or major controlling elements are indicated in the form of conventional wattmeter devices 34 and 36, each of which comprises a potential winding 38 energized through a transformer 40 by a measure of the voltage of the tie line circuit 10 and a current winding 42 similarly energized through a current transformer 44 by a measure of the tie line load current. The movable member 46 of each device transmits through a shaft 48 a rotative torque to a contact carrying arm 50 which torque is opposed by a tension spring 52. The adjustment is such that when the magnitude of tie line power is of the desired value, the arm 50 occupies the illustrated mid-position.

When, however, the power flow rises above this desired value, the arm biases, in the case of device 36, the contact member 54 into engagement with the stationary member L, and thereby energizes the governor calibrating motor 26 in a direction causing a reduction of input supplied to the generator driving prime mover 20 of generating unit 14. In the case of device 34, the movable contact 54 engages stationary member R, thereby causing the control motor to raise the output of generating unit 16. The combined effect is to correctively lower the tie line power flow back to the desired value.

In a similar manner when this power flow falls below the desired value, device 36 engages contact members 54 and R to increase the output of generating unit 14 and the device 34 engages members 54 and L to lower the output of generating unit 16. As a result, the power flow through tie line 10 is correctively raised.

Supplementary to the major power responsive control means just described, I provide in accordance with my invention the oscillation eliminating modifying elements indicated generally at 56 and 58. These elements are energized by voltages $E_{fc}$ proportional to the rate of change of the frequency to the voltage of the interconnected networks. In the construction illustrated, each device comprises a pair of permanently magnetized pole pieces N and S in the field of which an armature member 60 carrying the device winding 62 is positioned and arranged to impart to the before mentioned contact actuating shaft 48 a torque directly dependent upon the magnitude and polarity of the before referred to voltage $E_{fc}$.

In the arrangement for providing this voltage illustrated in Fig. 1, I utilize a special device 64 energized through potential transformer 40 by a measure of the tie line voltage and arranged to supply an output voltage $E_x$ which remains constant regardless of fluctuations in the magnitude of the energizing voltage $E_L$ as long as its frequency remains constant, but which is directly dependent upon the frequency of this voltage $E_L$. This device incorporates an iron core 72 having three legs. The first carries a primary winding 70 energized by $E_L$; the second is saturated and carries a secondary winding 66; the third leg has an air gap. The output voltage $E_x$ comprises a major component supplied by the secondary winding 66 to a phase shifting capacitor 68 and a second component comprised by a portion of the voltage $E_L$ appearing across the device primary winding 70. By properly apportioning the magnitudes of these components relative to each other, the voltage $E_x$ is caused to vary only upon changes in the frequency of the tie line voltage $E_L$.

This output voltage is then converted by means of a rectifier 76 into a unidirectional potential $E_r$, appearing across the resistor 78 connected with the rectifier output terminals. To convert this frequency proportional voltage $E_f$ into the desired potentials $E_{fc}$ proportional to the rate of change in frequency of the tie line voltage $E_L$, I connect a capacitor 80 serially in the energizing circuits of the modifying control devices 56 and 58.

As long as voltage $E_f$ remains constant, this capacitor assumes a charge depending upon the magnitude of this voltage and no further current flows through the device windings 62. In case the tie line voltage $E_L$ rises in frequency, $E_f$ proportionately increases and forces through the device windings 62 a current which charges the capacitor 80 to a new voltage level. Similarly, when the frequency of voltage $E_L$ falls and $E_f$ correspondingly decreases the capacitor forces through the windings 62 a discharge current of similar character. In both instances, the magnitude of this current is directly dependent upon the rate of change of the voltage $E_f$ and hence that of the frequency of tie line voltage $E_L$.

For purposes of explanation it may be assumed that the arrangement is such that in the case of a change in tie line power such as to cause the power responsive device to close its "lower" contacts, the modifying torque from the frequency change responsive element coupled therewith will be in the opposite or raising contact closing direction; the rise in tie line power change which occasioned the correction being normally accompanied by a decrease in frequency. Likewise, in the case of a lowering of the regulated power, a change which tends to occasion a "rising" correction, the accompanying rise in frequency of the tie-line voltage which normally results produces a modifying force in the supplemental control element which similarly alters the major corrective force in a manner to eliminate overshooting of the regulatory action and the consequential objectionable oscillations.

As already stated, in the cases typified by the showing of Fig. 4 in which the interconnecting tie line possesses substantial reactance, it is necessary to energize the generating unit control elements in accordance with the voltage at the end of the tie line circuit to which the corresponding network system is connected. Thus in the case of the control apparatus comprising elements 34 and 56, the potential transformer 40' will be connected with the left end of the tie line to which network No. 1 is directly connected, the generating unit 16 (not reproduced in Fig. 4) to be controlled forming a part of this network. Likewise, devices 36 and 58 comprised by the control apparatus for generating unit 14 forming a part of network 2 are energized through a potential transformer 40'' connected with the right end of the tie line circuit.

In applications involving the described high-impedance tie lines, the represented watt-responsive elements 34 and 36 may of course be replaced by comparable devices sensitive either to the voltage-drop through the tie line or to the phase-angle shift between the voltage vectors of the two interconnected network systems. As both of these quantities typify measures of the tie-line power flow, the mentioned substitutions in no way alter the basic form of operation of the regulating system under consideration.

Instead of using the represented capacitor 80 to convert the frequency proportional voltage $E_f$ into the frequency-change proportional voltage $E_{fc}$, the circuit combination shown in Fig. 5 may also be employed. This comprises a transformer having its secondary winding 82 connected with the winding 62 (not reproduced in Fig. 4) of the device (56 or 58) to be energized and its primary winding 84 connected to be energized by a measure of the voltage $E_f$. As long as this voltage remains constant, no potential will be induced in the secondary winding 82. When this voltage changes, however, there will be induced in the secondary winding the desired voltage $E_{fc}$ which is proportional to the rate and direction of change of the frequency proportional voltage $E_f$.

Likewise, instead of employing the special transformer 64 and the static full wave rectifier 76, shown in Fig. 1, to convert the line voltage $E_L$ into the frequency proportional voltage $E_f$, the circuit combination of Fig. 6 may also be used. This comprises a resonance circuit made up of a reactor 86 and a capacitor 88 parallel connected therewith. Through a resistor 90, the line voltage $E_L$ is applied to a portion of this reactor. Between the left end of this resistor and a tap 92 further along the reactor, there is caused to appear a voltage $E_z$ which, when the frequency of potential $E_L$ is of the nominal value, may, through a proper proportioning of the circuit parts, be caused to have zero magnitude.

When the frequency rises above this nominal, $E_z$ assumes a value in a given phase relation with $E_L$. When the frequency falls below the nominal, $E_z$ assumes another value of reversed phase relation. In both instances, the magnitude of $E_z$ is directly dependent upon the frequency deviation.

To convert this alternating voltage $E_z$ into a direct current voltage, $E_f$, which follows similar magnitude changes and upon phase reversal of $E_z$ reverses its polarity, I utilize a vibratory contact type of rectifier represented as comprising a pair of contacts 94 which are alternately opened and closed by a solenoid 96 energized by the impressed voltage $E_L$. To smooth out the ripples in this voltage before application to the output resistor 78, the illustrated filter apparatus 98 may be connected in the manner shown.

When utilized to energize the frequency change responsive elements shown at 56 or 58 in Figs. 1 and 4, the effect of this voltage $E_f$, is exactly the same as that of voltage $E_f$ previously described.

In some cases it may be desired to amplify voltage $E_z$ simultaneously with its rectification and conversion into the output potential $E_f$; this may be done by employing the circuit combination shown in Fig. 7. This combination comprises a pair of electronic tubes 100 and 102 in the major element circuits of which are connected sources 104 and 106 of unidirectional energizing potential. The output of this rectifier combination is taken from points 108 and 110 which respectively constitute the positive and negative polarities of the output circuit.

The control grids 112 of these electronic tubes are subjected to a control voltage determined by $E_z$. This is supervised by the line voltage $E_L$ in such manner that one of the tubes will amplify voltage $E_z$ only when the frequency has increased to a value which is greater than the normal value while the other tube will amplify said voltage only when the frequency has dropped to a value smaller than normal. This effect is obtained by providing in the grid circuits the illustrated rectifiers 114 which during alternate half cycles of line voltage $E_L$, respectively become conductive to bridge the terminals of the circuits supplying the line voltage $E_L$ to the corresponding tube. In consequence only the voltage $E_z$ remains applied to the grid and as a result the associated tube will, during that particular half cycle, pass from its energizing source a current determined by voltage $E_a$.

The output voltage $E_r$, therefore has imparted to it a value directly dependent upon that of the frequency dependent control voltage $E_z$ and may be used to energize the before described frequency change responsive supplementary control devices.

To secure best results from the herein described system of my invention, the torques exerted on the supplemental or frequency-change responsive control elements should be so adjusted that the previously discussed equations will be satisfied at least approximately. Since the constant ($k_1$ or $k_2$) included in the term which contains the time-derivative of the frequency varies with the nominal output of the active generating units and with the network system "starting time", the value of this constant will change somewhat when some of the generating units are shut down or additionally connected and when the system load changes. In view of the above, an adjustment on the basis of average values will in a majority of instances be found most satisfactory.

As already indicated, it is not strictly necessary that the method of control disclosed be applied to generating units of both of the two interconnected network systems, since it is equally feasible to control one or more generating units belonging to but one of these systems and to keep the frequency of the other constant by means of the controlling action of a frequency regulator. Since my improved form of control measures accurately the actual amounts of power deficiency or excess in each network system, the occurrence of load swings due to a transfer of load from the generating units which are under frequency control to the generating units which are under load control, and vice versa, is altogether eliminated.

The invention may also be applied with advantage when any other flow of power must be controlled in some definite manner. If for instance the load carried by a generating unit must be kept constant, an advantageous arrangement will be that in which the output power of the unit is controlled by a quantity made up of the unit output measured by the regulator and the before described corrective term which depends on the time derivative of the frequency.

Although I have shown and described certain specific embodiments of my invention, I am fully aware that many modifications thereof are possible. My invention, therefore, is not to be restricted, except insofar as is necessitated by the prior art and by the scope of the appended claims.

I claim as my invention:

1. In an alternating-current system comprising apparatus, including a generating unit, having synchronously rotating masses, the combination with a regulator for maintaining within given limits a measure of the output of said unit of means for causing said regulator to be sensitive to departures in said output measure from a desired value and additional means for causing the regulator also to be sensitive to a measure of the energy supplied to or withdrawn from the rotating masses of said apparatus.

2. In an alternating-current system comprising apparatus, including a generating unit, having synchronously rotating masses, the combination with a regulator for maintaining within given limits a measure of the output of said unit of means for causing said regulator to be sensitive to departures in said output measure from a desired value and additional means for causing the regulator also to be sensitive to the rate of changes in the frequency of the generating unit voltage.

3. In a system comprising a tie-line circuit which interconnects two alternating-current networks each of which includes apparatus having synchronously rotating masses and one of which includes a generating unit, the combination with a regulator for adjusting the output of said unit to thereby maintain within given limits the flow of power through said tie-line of means for causing the regulator to be sensitive to a measure of said power flow and additional means for causing the regulator also to be sensitive to a measure of the energy supplied to or withdrawn from the rotating masses of said apparatus.

4. In a system comprising a tie-line circuit which interconnects two alternating-current networks each of which includes apparatus having synchronously rotating masses and one of which includes a generating unit, the combination with a regulator for adjusting the output of said unit to thereby maintain within given limits the flow of power through said tie-line of means for causing the regulator to be sensitive to a measure of said power flow and additional means for causing the regulator also to be sensitive to the rate of changes in the frequency of the generating unit voltage which may result from variations in the loading conditions of either of said networks.

5. In a system comprising a tie-line circuit which interconnects two alternating-current networks each of which includes one or more generating units and one of which is provided with frequency-regulating means, the combination with a regulator for adjusting the output of a generating unit in the other of said networks to thereby maintain within given limits the flow of power through said tie-line of means for causing the regulator to be sensitive to a measure of said power flow and additional means for causing the regulator also to be sensitive to the rate of changes in the frequency of the voltage of the associated network.

6. In a system comprising a tie-line circuit which interconnects two alternating-current generating units and one of which is provided with frequency-regulating means, the combination with a regulator for adjusting in opposite senses the outputs of generating units in said two networks to thereby maintain within given limits the flow of tie-line power of means for causing the regulator to be sensitive to a measure of said power flow and additional means for causing the regulator also to be sensitive to the rate of changes in the frequency of the tie-line voltage.

7. In a system comprising a tie-line circuit of substantial impedance which interconnects two networks each of which includes synchronous apparatus and one of which includes a generating unit, the combination with a regulator for adjusting the output of said unit to thereby control the tie-line power flow of means for causing the regulator to respond to a measure of said power flow and additional means for causing the regulator also to respond to the rate of changes in the frequency of the voltage of the network of which the unit forms a part.

8. In a system comprising a tie-line circuit of substantial impedance which interconnects two networks each of which includes one or more synchronous generating units, the combination with two regulators for respectively adjusting the outputs of generating units in said two networks to thereby control the tie-line power flow of means for causing each of said regulators to be sensitive to a measure of said power flow and additional means for causing the regulator also to be sensitive to the rate of changes in the frequency of the network of which the controlled generating unit forms a part.

9. In a system for regulating a characteristic of an alternating-current circuit the combination with a regulator control element of means for supplying thereto an energizing current determined by the rate of change of the frequency of the circuit voltage.

10. In combination with an alternating-current circuit and a regulator control element, means for energizing said element in accordance with a measure of the rate and direction of change of the frequency of the circuit voltage.

11. Means for supplying to a regulator control element an energizing current determined by the rate and direction of change of the frequency of an alternating-current voltage comprising a circuit for producing a unidirectional potential which varies with the said frequency, and a second circuit, including said control element, for producing a current the magnitude of which is determined by the rate of said variations and the polarity by the direction thereof.

12. Means for supplying to a regulator control element an energizing current determined by the rate and direction of change of the frequency of an alternating current voltage comprising a circuit for producing a unidirectional potential which varies with the said frequency and a second circuit including a capacitor serially connected with said control element for energization by a measure of said unidirectional potential.

13. Means for supplying to a regulator control element an energizing current determined by the rate and direction of change of the frequency of an alternating-current voltage comprising a circuit for producing a unidirectional potential which varies with the said frequency, and a magnetic-core device having a primary winding connected for energization by a measure of said unidirectional potential and a secondary winding connected to impress the voltage induced therein upon said control element.

14. Means for producing a unidirectional potential which is a function of the frequency of an alternating-current voltage comprising a magnetic-core device having a primary winding energized by said voltage, a secondary winding, a capacitor parallel-connected with said secondary, and a rectifier energized by a voltage made up of that appearing across said secondary and that appearing across part of said primary winding, the output voltage of said rectifier constituting the unidirectional potential first named.

ERICH FRIEDLÄNDER.